United States Patent Office.

CHARLES D. BOSS AND CHARLES D. BOSS, JR., OF NEW LONDON, CONNECTICUT.

Letters Patent No. 108,097, dated October 11, 1870.

IMPROVEMENT IN THE MANUFACTURE OF BISCUIT.

The Schedule referred to in these Letters Patent and making part of the same.

*To all whom it may concern:*

Be it known that we, CHARLES D. BOSS and CHARLES D. BOSS, Jr., of the city and county of New London in the State of Connecticut, have invented a certain new and useful Improvement in the Manufacture of Biscuit; and we do hereby declare that the following specification is a full, clear, and exact description thereof.

By the common method of making that variety of dry bread, known as "milk-biscuits," flour-dough is mixed with a quantity of prepared "yeast-sponge" to induce the process of fermentation. The acid so generated is then subjected to the neutralizing action of an alkali, after which the mass of dough is ready to be molded and baked. The length of time required for all the processes involved to be performed is from twelve to fourteen hours, and the operation is attended with a loss in the weight of material of from eight to ten pounds in a barrel of flour.

Our improvement consists in the employment of tartaric acid as an agent of fermentation in place of the yeast-sponge, in combination with the other materials mentioned, in the proportions stated, whereby the length of time required for the manufacture of this kind of bread is reduced from about fourteen to two and one-half hours, while its quality is greatly improved by its increased softness and delicacy, and the process is attended with no sensible loss of weight in material.

We take one hundred and ninety-six pounds of flour, and intimately mix with it, during the operation of sifting the same, one pound of powdered tartaric acid. We then take one pound eight ounces of bicarbonate of soda, one pound of salt, and five pounds of sugar, dissolved together in one gallon of water, and mix with the acidulated flour. To this mass twenty-eight pounds of lard or butter and six gallons of water are added, and the whole is thoroughly kneaded into dough.

The carbonic-acid gas evolved upon the contact of the bicarbonate of soda with the acid in the flour immediately changes the mass, and renders it in a short time fit for baking, and the action of such agent so applied with the other materials in the proportions substantially as given, renders the bread, when baked, peculiarly soft and delicate.

We do not claim to have discovered that a mass of dough can be leavened by an acid and an alkali evolving carbonic-acid gas while incorporated with flour; neither do we claim the employment separately of any one of the materials named; but

What we claim as our invention, and desire to secure by Letters Patent, is—

The composition for flour-biscuit, composed of the materials in the proportion and compounded in the manner substantially as specified.

CHARLES D. BOSS,
CHARLES D. BOSS, Jr.

Witnesses:
EZRA C. SMITH,
WALTER J. CHANEY.